United States Patent [19]
Patsy, Jr.

[11] Patent Number: 5,555,695
[45] Date of Patent: * Sep. 17, 1996

[54] EXTRUSIONS PROVIDING FOR LOW DEFORMABILITY

[76] Inventor: Glorio J. Patsy, Jr., 925 McFarland/400 Blvd., Alpharetta, Ga. 30201

[ * ] Notice: The term of this patent shall not extend beyond the expiration date of Pat. No. D. 309,351.

[21] Appl. No.: 51,943

[22] Filed: Apr. 26, 1993

Related U.S. Application Data

[63] Continuation-in-part of Ser. No. 730,176, Jul. 16, 1991, abandoned, which is a continuation-in-part of Ser. No. 530,331, May 30, 1990, Pat. No. 5,076,033, which is a continuation-in-part of Ser. No. 361,112, Jun. 5, 1989, Pat. No. Des. 309,351.

[51] Int. Cl.$^6$ ............................. E04H 15/32; E04C 3/00
[52] U.S. Cl. ...................... 52/730.4; 52/730.5; 52/731.2; 52/732.1; 52/222; 52/63
[58] Field of Search .......................... 52/738, 737, 730.1, 52/730.4, 730.5, 731.1, 731.2, 731.3, 732.1, 732.2, 732.3, 63, 86, 222; 160/392, 395

[56] References Cited

U.S. PATENT DOCUMENTS

| | | | |
|---|---|---|---|
| D. 309,351 | 7/1990 | Patsy | D25/119 |
| 4,813,196 | 3/1989 | Bokelund et al. | 52/738 X |
| 4,926,605 | 5/1990 | Milliken et al. | |
| 5,044,131 | 9/1991 | Fisher | 52/63 |
| 5,076,033 | 12/1991 | Patsy | 52/222 |
| 5,209,029 | 5/1993 | Foerst | 52/63 |
| 5,237,785 | 8/1993 | Lukes | 52/86 |
| 5,242,004 | 9/1993 | Shilling | 160/57 |

OTHER PUBLICATIONS

ABC Extrusion Company, "Easy Sheet ABC080187".
Markinsen–Spettman Brochure.
IATA, "Technical Catalogue, Awning Frames", 1985–1986 Edition.
Informal Illustration of BAT Italia extrusion.
Sparkle Sign Co. Extrusion Specification, Released for tooling Aug. 29, 1988.
"RIRI 1988 Parts List", pp. 17, 22.
William L. Bonnell Co., Inc., Engineering Drawing of Aluminum Extrusion Cross Section, dated Apr. 11, 1988.

*Primary Examiner*—Robert J. Canfield
*Attorney, Agent, or Firm*—Richard C. Litman

[57] ABSTRACT

A channeled extrusion for both framing and holding flexible coverings, such as in fabric covered awnings and similar framed, flexible cover structures. Such extrusions commonly contain at least one opening or channeled side, and when such extrusions are bent or arcuately formed in order to provide for curved surfaces, the channeled side may tend to close due to the opposing forces applied in the opposite walls due to the bending action. This is especially true when the channeled side is parallel to the plane of bending. The extrusions provided preclude this closing tendency of the slot and offer lateral structural stability. These provided extrusions can be formed into arcuate shapes without the need for spacers in the channel or special bending tools designed to prevent the closure of the channel. The reinforcement means provided include these elements: an inner lateral web, thickened upper walls, distension zones, stress-relieving indentations, and inner longitudinal bracing.

45 Claims, 4 Drawing Sheets

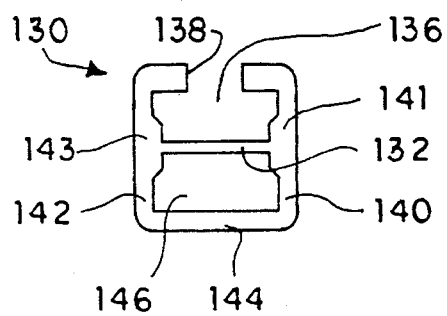
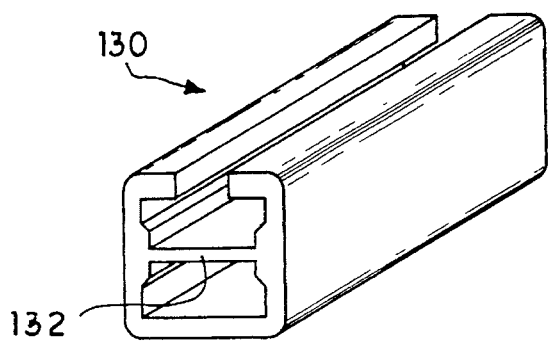
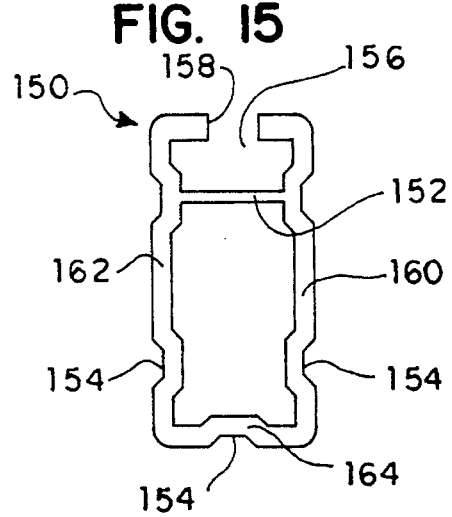
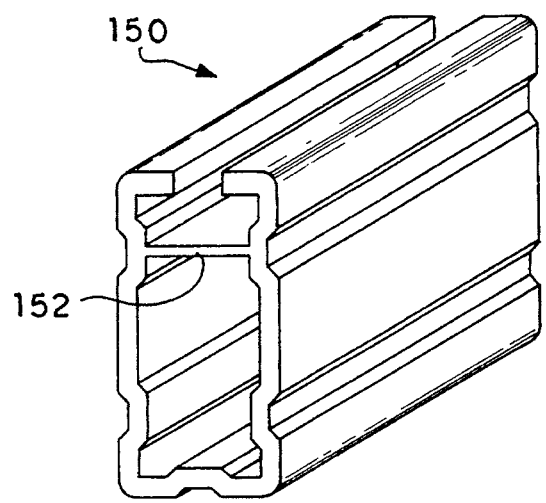
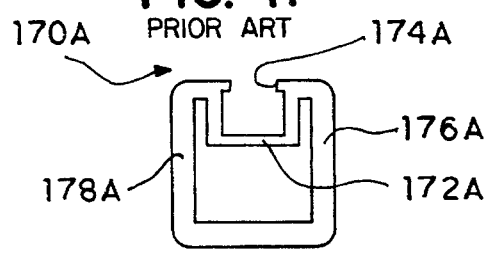
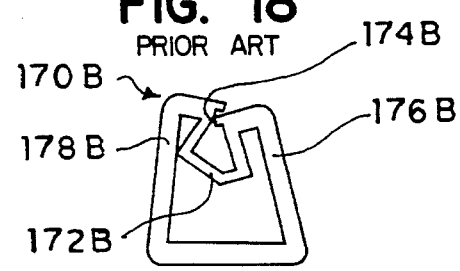

EXTRUSIONS PROVIDING FOR LOW DEFORMABILITY

REFERENCE TO RELATED PATENT APPLICATIONS

This application is a continuation-in-part of utility patent application Ser. No. 07/730,176, filed Jul. 16, 1991 and abandoned on Jul. 9, 1993, which is a continuation-in-part of utility patent application Ser. No. 07/530,331, filed May 30, 1990 and issued as U.S. Pat. No. 5,076,033 on Dec. 31, 1991, which is a continuation-in-part of design patent application Ser. No. 07/361,112, filed Jun. 5, 1989 and issued as Des. U.S. Pat. No. 309,351 on Jul. 17, 1990.

FIELD OF THE INVENTION

This invention relates generally to extruded shapes which may be used for structural framing, such as for fabric-covered awnings, framed, flexible cover structures, and the like, and more specifically, to improved extrusion providing for low cross-sectional deformation when arcuately bent.

BACKGROUND OF THE INVENTION

Awnings and similar fabric structures are typically constructed of a framework covered with a fabric or other flexible material. Over the years, the framework assembly has developed from wooden constructions to more advanced designs employing aluminum (or other light metal) extrusions with recessed fabric attachment zones. But despite the advantages offered by these extrusions, all heretofore known metal extrusions with recessed fabric attachment zones are functionally limited or become functionally defective when arcuately bent to form complex frame structures.

A number of present extrusions contain a recessed fabric attachment zone to which fabric is stapled or otherwise attached. In assembling a frame, such extrusions are either welded together or joined by means of mechanical fasteners. Subsequently, fabric is inserted into the recessed fabric attachment zone and secured by staples, tensioning clips or like methods. Typically, a pliable protective and/or decorative cap is wedged into the recessed zone to conceal and protect the joint.

When such extrusions are assembled into a plurality of straight sections, such a fabrication method generally works well. However, it is often desirable to form structures having curved surfaces wherein certain underlying and supporting extrusion members must be bent to a desired arcuate shape. Depending upon the relationship between the side of the extrusion containing the recessed attachment zone and the direction of curvature in the extrusion, the act of bending such an extrusion inevitably causes the recessed zone to inwardly collapse, thus impeding installation of the overlying fabric material and cap.

The inward collapse of the recessed attachment zone typically occur when the recessed attachment zone is oriented 90° to the extrusion surface providing either a convex or concave bend. In such situations, the material along the outside of such a bend will be stretched and drawn to the inside of the bend, while the material along the inside of the bend will tend to compress and be forced to the outside of the bend. If the side containing the recessed attachment zone is between these opposing forces, the recessed attachment zone will be forced to a narrower opening due to the lack of any structural support across the opening. While this scenario would likely cause the greatest amount of distortion, a degree of distortion will occur in virtually any orientation of the recessed attachment zone when such an extrusion is bent.

If the inner attachment zone tends to close, or becomes significantly reduced in width, or becomes distorted while the extrusion is being formed into an arcuate shape, then it is only with great difficulty that the fabric covering and finishing trim pieces can be attached to this extrusion after it is incorporated into a frame for later fabric attachment.

Various solutions are known for dealing with this problem, such as inserting some form of spacing material within the inner attachment zone during the forming of the extrusion. This is not particularly practical, as the additional steps of inserting such spacing material prior to bending the extrusion, and then removing the spacing material, must be accomplished. This adds significantly to the labor and cost in forming such bends.

Another method used to maintain the proper recessed zone width during extrusion bending is to use bending devices, such as roll form benders or radiused die benders, which incorporate one or more tongues which may be inserted within the recessed attachment zone in order to lessen deformation. This is also a relatively costly process, as the bending tool must be modified to include such tongue extensions. Further, such tongues may roughen the interior edges of the recessed attachment zone as the extrusion is worked, thus possibly damaging the fabric covering.

The need arises for channeled extrusions for use in framed, flexible cover structures, which extrusions may be bent and formed in arcuate shapes. Such channeled extrusions must be capable of being bent or formed without deforming or narrowing the channel of the extrusion, and further without the requirement for specialized channel inserts or specially modified bending tools. Such extrusions would inherently provide for stability of the overall cross-sectional shape in bending by virtue of the shape and construction of the extrusion itself without becoming significantly distorted or deformed, particularly when the extrusion channel is located on a side parallel to the bending plane of the extrusion.

DESCRIPTION OF THE RELATED ART

Milliken U.S. Pat. No. 4,926,605 discloses a construction assembly for closure structure comprising an extrusion with an inner chamber separate from the outer walls defined therein. The stapling slot of FIG. 17 collapses when formed into an arcuate shape with the slot to the side of the bow unless spacing material or a tongue is inserted into the slot before bending. If the stapling slot collapses then the stapler cannot be inserted to attach the fabric to the extrusion and/or trim pads cannot be installed satisfactorily.

ABC Extrusion Company discloses in their "Easy Sheet—ABC 080187" a slotted extrusion for building awnings. ABC Awning System information discloses that their Roll Tool (roll form bender) is equipped with a tongue on the wheel. This is to prevent the extrusion slot from collapsing even when the extrusion is formed into an arcuate shape with the slot on the top of the extrusion.

An extrusion manufactured for the Sparkle Sign Company suffers from the same deficiency. (A cross-section of this extrusion is shown as extrusion 190 in FIG. 19). This extrusion has a recessed fabric attachment zone spanning opposite sides of the extrusion. The central inverted arch of the attachment zone is neither designed to prevent nor capable of preventing the opposing sides from coming together and closing the opening into the recessed fabric attachment zone when the extrusion is formed into an arcuate shape with the recessed zone parallel to the bending plane.

The various slotted extrusions with stapling platforms that originated in Europe, and now widely in use in the United States, all require that spacers first be inserted into the stapling slot or benders with tongues for the stapling slot if these shapes are to be formed into arcuate shapes and maintain the uniformity of the stapling slot opening. These "European" systems or shapes, even with special bending techniques can only be formed into arcuate shapes with the stapling slot on the top of the bow unless very specialized and prohibitively expensive bending equipment were developed and manufactured.

In addition to the above cited references, the applicant is aware of other slotted extrusions in use in fabric awning and other framed, flexible cover structure manufacturing. None of these extrusions can be formed into arcuate shapes with the slots on either of four sides and the slots as useable before they were bent unless special bending techniques or equipment is used.

None of the above noted patents or cited prior art, either singly or in combination, are seen to disclose the specific arrangement of concepts disclosed by the present invention.

SUMMARY OF THE INVENTION

By the present invention, a channelled extrusion is provided which may be used in the construction of framed, flexible cover structures, such as awnings and the like.

Accordingly, one of the objects of the present invention is to provide channeled extrusion configurations which may be arcuately formed or bent without the need for specialized equipment, tools, spacers or the like.

Another of the objects of this invention is to provide channeled extrusion configurations that may be formed into arcuate shapes with the channel on either side of the extrusion using bending equipment regularly found in shops engaged in fabricating awning and framed, flexible cover structures.

Another of the objects of the present invention is to provide channeled extrusion configurations which may be arcuately formed by such non-specialized means and which further prevent collapse or deformation of the channel during the bending operation.

Another of the objects of the present invention is to provide channeled extrusion configurations which are particularly adaptable to such bending with the channel disposed parallel or perpendicular to the bending plane.

Another of the objects of this invention is to provide channeled extrusion configurations with a channel which will not close, become significantly reduced in width or become unusably distorted from its original structure after the extrusion is formed into an arcuate shape with the channel on any of four sides using readily available equipment and without inserting spacers into the channel.

Another of the objects of the present invention is to provide channeled extrusion configurations in which an inner web member provides lateral reinforcement.

Another of the objects of the present invention is to provide channeled extrusion configurations in which additional longitudinal strength is provided by means of further reinforcement patterns integrally formed in one or more of the planes of the extruded shape.

With these and other objects in view, which will more readily appear as the nature of the invention is further described below, the invention consists in the novel combination and arrangement of parts hereinafter more fully described, illustrated and claimed with reference being made to the attached drawings.

BRIEF DESCRIPTION OF THE DRAWINGS

FIG. 13 is a cross-sectional view of another version of the extrusion configuration shown in FIG. 9 as modified in accordance with the present invention.

FIG. 14 is a perspective view of the modified extrusion shown in FIG. 13.

FIG. 15 is a cross-sectional view of another extrusion configuration according to the present invention.

FIG. 16 is a perspective view of the extrusion shape shown in FIG. 15.

FIG. 17 is a cross-sectional view of an extrusion shape as disclosed in FIG. 1 of U.S. Pat. No. 4,926,605.

FIG. 18 is a cross-sectional view of the extrusion shape shown in FIG. 17, after forming an arcuate bend is such a section with the plane of the side containing the recessed attachment zone parallel to the bending plane.

Similar reference characters designate corresponding parts throughout the several figures of the drawings.

DETAILED DESCRIPTION OF THE INVENTION

Referring now to the various figures of the drawings, the present invention will be seen to relate to improved extrusion shapes for use in fabric covered awning and other framed, flexible cover structure. Extrusion cross-sectional configurations 10, 30, 50, 70, 90, 110, 130 and 150 are shown respectively in FIGS. 1, 3, 5, 7, 9, 11, 13 and 15 of the drawings each respectively disclose an inner reinforcement web member 12, 32, 52, 72, 92, 112, 132 and 152; these inner reinforcement webs are a universal feature of the present invention and provide for many of the structural and functional advantages described herein. Extrusion cross-section 10 as shown in FIG. 1 will generally serve to initially illustrate those structural and functional features which are generally common to each of the extrusions of the present invention; various differences will be described in detail below.

Figure 1:
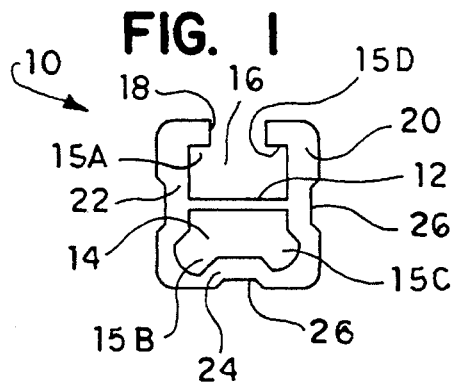
FIG. 1 is a cross-sectional view of one of the extrusion configurations of the present invention, showing an inner reinforcement web member provided therein.

As shown in FIG. 1, reinforcement web member 12 contactably extends between sides 20 and 22, laterally bisecting the interior of extrusion 10, thus forming a first interior cavity 14 and a second interior cavity 16. In the extrusion of FIG. 1, although preferred, it is unnecessary that the reinforcing web member be straight and parallel to base member 24. However, in other embodiments, where prevention of internal collapse is afforded solely by a reinforcing web member, the corresponding reinforcing web member should be straight and parallel to the corresponding base member.

Figure 2:
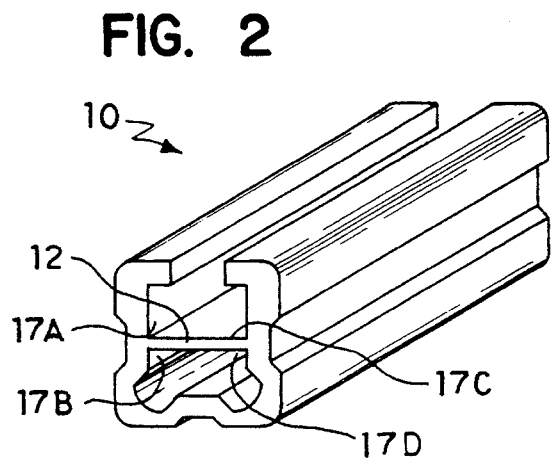
FIG. 2 is a perspective view of the extrusion configuration shown in FIG. 1.
Figure 20:
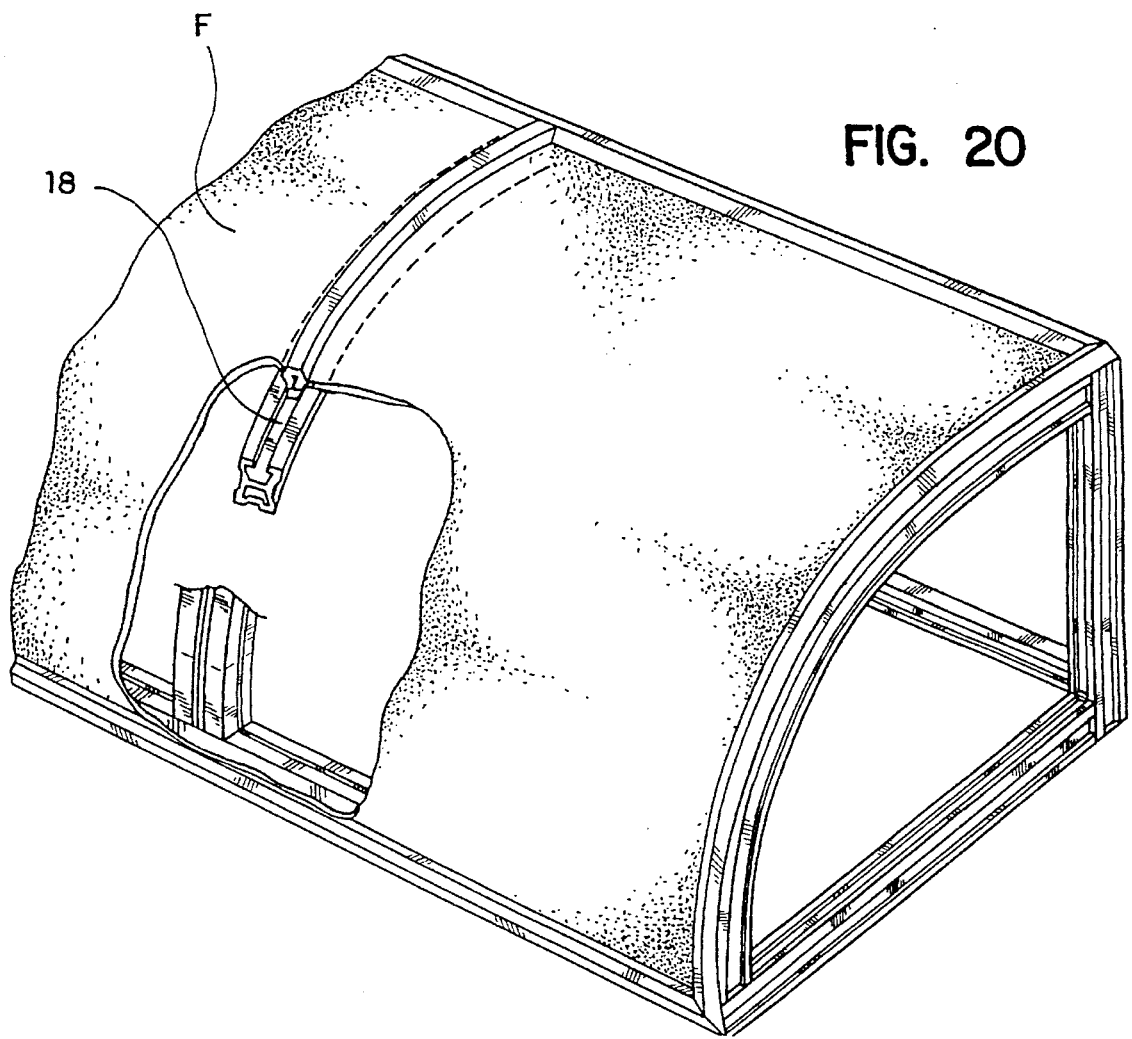
FIG. 20 is a perspective view partially in section showing an awning and frame with arcuately curved frame members.

As also shown in FIG. 1, second interior cavity 16 is open on one side by means of channel 18. Channel 18 provides access to second interior cavity 16 for the purpose of inserting and securing fabric material F as shown in FIG. 20 of the drawings. Accordingly, in one regard, reinforcement web member 12 functions in the present invention as an attachment platform for securing fabric material F within extrusion 10. While the prior art also provides for a stapling or securing platform 172a and 172b, as respectively shown in extrusions 170a and 170b of FIGS. 17 and 18 of the drawings, it can be seen that such a platform lacks the structural integrity provided by the combination reinforcement web and securing platform 12 as shown in FIGS. 1 and 2 of the present invention.

While the prior art extrusion 170a generally provides a structure for the attachment of fabric material thereto, the deficiency of such an extrusion 170a becomes apparent when a frame containing curved structural members is desired. FIG. 20 provides an example of such a frame. It is often desirable to form an arcuate bend or curve in such frame members, in which the channel opening or channel 18 is to the side of the bend direction, as shown in FIG. 20. In other words, the side of the extrusion 10 containing channel 18 is parallel to the plane of the curve of the extrusion. When such a bend is made, the first or convex side 20 of the extrusion, i.e. furthest from the center of the bend radius, will be stretched and will be drawn inward, while the second (interior or concave) side 22 will be compressed and will tend to be forced outward. This is a common problem in bending any material of a finite thickness (e.g. square, round or other forms of tubing).

It will be appreciated that when the side containing slot 170a is positioned parallel to the bending plane, that the extrusion 170a of the prior art does not provide for any support across the slot opening 174a and thus allows the first and second sides 178a and 176a to be urged together, thereby closing slot opening 174b as shown in FIG. 18.

The various extrusions 10, 30, 50, 70, 90, 110, 130 and 150 of the present invention obviate this problem due to their respective structural reinforcement web members 12, 32, 52, 72, 92, 112, 132 and 152 shown in those figures. It will be appreciated that while the same forces described above will be acting upon the extrusions of the present invention when they are arcuately formed as described above, the inner reinforcement web member (e.g., 12 in FIG. 1) precludes the closing of the channel (18 in FIG. 1) by preventing the first and second sides (20 and 22 in FIG. 1) from closing toward each other as the bend is made.

Figure 9:
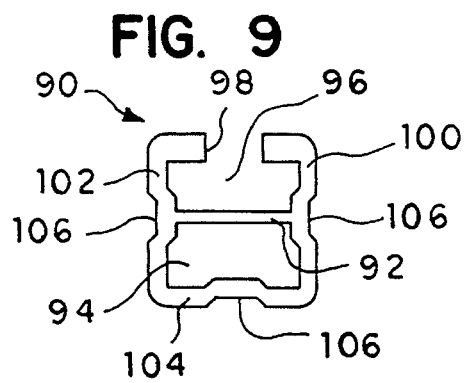
FIG. 9 is a cross-sectional view of another extrusion configuration according to the present invention.
Figure 10:
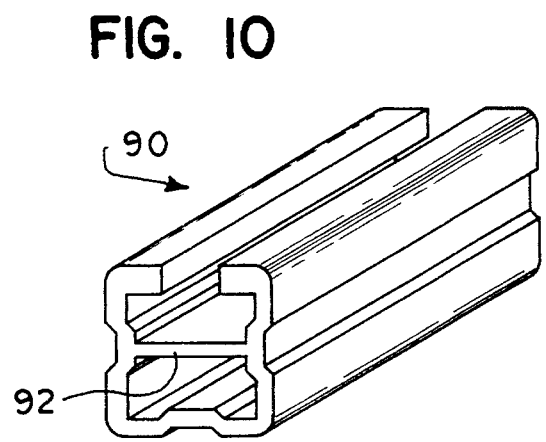
FIG. 10 is a perspective view of the extrusion configuration shown in FIG. 9.

The extrusion of FIG. 1 discloses further structural and functional improvements neither disclosed nor suggested in the prior art. First and second sides 20 and 22, as well as base 24, contain reinforcement indentations 26 which serve to further longitudinally strengthen extrusion 10. In FIGS. 9 and 10, extrusion 90 has corresponding sides and base 100, 102 and 104 of which will be seen to have similarly positioned indentations 106. It will be noted, however, that the upper cavity 16 of extrusion 10 in FIG. 1 is of a generally quadrangular shape; the interior walls of upper cavity 16 do not follow the contours of sides 20 and 22 with their reinforcing indentations 26, as do the interior walls of upper cavity 36 in extrusion 30. The additional material provided in the upper cavity 16 of extrusion 10 may offer some additional structural advantages in some applications by functioning as longitudinal bracing.

Figure 3:
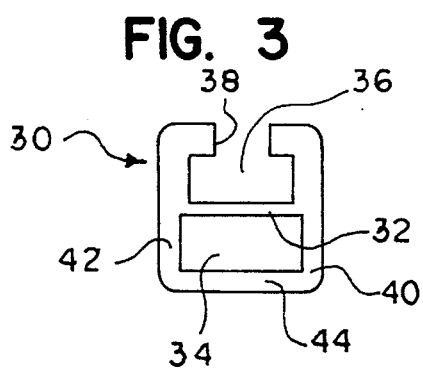
FIG. 3 is a cross-sectional view of another extrusion configuration according to the present invention.
Figure 4:
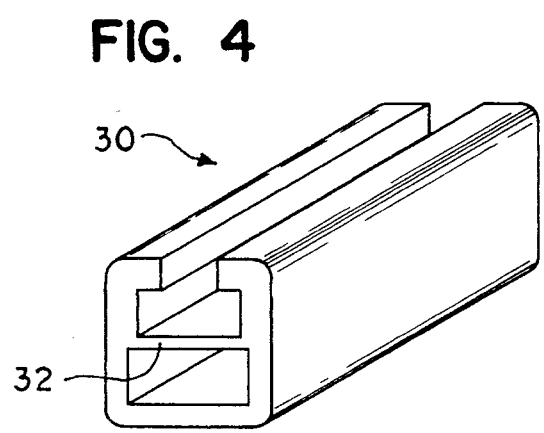
FIG. 4 is a perspective view of the extrusion shape shown in FIG. 3.

Extrusion 30 of FIGS. 3 and 4 will be seen to provide the same structural advantage of reinforcing web member 32 as shown in other drawing figures and described above. However, corresponding first and second sides 40 and 42, as well as base 44, will be seen to lack any indentations as described above.

FIGS. 15 and 16 disclose an extrusion 150 which provides for first and second sides 160 and 162 of approximately twice the length of those sides shown in the various other drawing figures. Additionally, lower side indentations 154 are included in sides 160 and 162. The additional depth provided by longer sides 160 and 162 provide for greater bending strength in a plane parallel to sides 160 and 162. Correspondingly, a greater force will be applied across channel opening 158, tending to close channel opening 158. This is precluded by inner reinforcement web member 152, as in the case of the other extrusions of the present invention described above.

Each of the extrusions described above provides yet another advantage: The upper or second cavities 16, 36, 56, 76, 96, 116, 136 and 156 extend completely between the inner walls of the corresponding first and second sides of extrusions 10, 30, 50, 70, 90, 110, 130 and 150. These larger cavities provide additional space for the insertion of fabric folds or material.

While the above embodiments disclose specific extrusions with walls that will remain in substantially parallel relationship with each other during bending, numerous other operable variations can be made by modifying, multiplying, adjusting, enhancing and/or otherwise combining the specific elements that provide the structural integrity of each of the disclosed extrusions.

The theory underlying the function of the reinforced web member is straightforward. An extrusion may be considered as a longitudinal square or rectangular shape where one portion of one of its sides is omitted to create a slot. If these slotted shapes need to be reinforced for bending, one means of reinforcement would be to use a web below the slot that fully bridges the sides of the extrusions (i.e. "contactably extends" from one side to the other) as a tie beam would between two walls to prevent the sides from moving toward each other. While the use of a single straight reinforcing member may be sufficient for certain bending applications, other situations may require greater bending tolerance, and thus, other additional means of reinforcement are desired. In these embodiment, greater strength will typically be achieved if these additional reinforcement means are closely associated with the reinforcing web member. However, it is not always required.

A first additional means to maintain the walls defining the channel in substantially parallel relationship with each other during bending, involves thickening the upper side walls. By increasing the width of the upper side walls in these extrusions, the upper side walls are made significantly more rigid. Accordingly, inward collapse is impeded. Examples of such thickened upper side walls can be seen in FIGS. 1, 3, 5 and 7. In each of these embodiments, it is noted that the thickened width occurs in a location adjacent to where the reinforcing web member contacts the side member. While such a configuration allows the thickened upper wall to reinforceably brace the web member, it is believed that the thicker upper walls need not be adjacent in every variation of the present invention.

Another additional means to maintain the walls defining an extrusion channel in substantially parallel relationship with each other during bending, involves the use of indentations (external or internal) in either of the extrusion's side walls and/or the extrusion's base member. It is believed that such indentations reduce or change the pertinent tensions and shearing forces urging the sidewalls to inwardly collapse upon bending and thus impede the narrowing of the respective channels. Examples of the use of indentations are seen in the extrusion cross-sections illustrated in FIGS. 1, 9, 11 and 15. Extrusion 10 of FIG. 1, extrusion 90 of FIG. 9 and extrusion 150 of FIG. 15 all show the use of the indentation in the side members in a location where the reinforcing web member makes contact. As with the use of thickened upper walls, it is believed that such a configuration allows the thickened indentation to reinforceably brace the web member. However, as illustrated by extrusion 150, it is believed that the thicker upper walls need not be adjacent in every variation of the present invention. Furthermore, the indentations may appear in areas other than the side members. For example, the indentation featured in extrusion 110 appears solely in 124.

Figure 11:
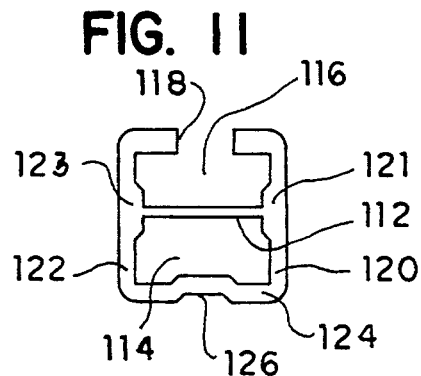
FIG. 11 is a cross-sectional view of a version of the extrusion configuration shown in FIG. 9 as modified in accordance with the present invention.
Figure 12:
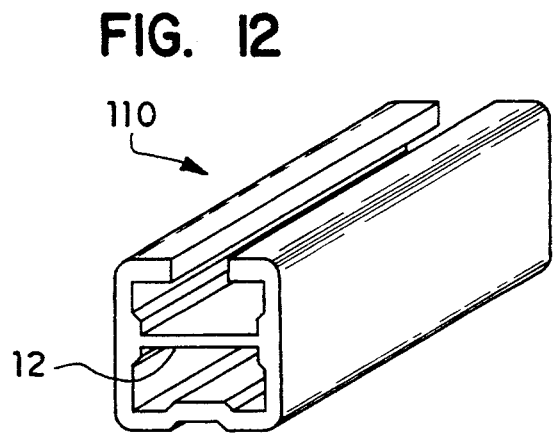
FIG. 12 is a perspective view of the modified extrusion shown in FIG. 11.

Another additional means to maintain the walls defining the channel in substantially parallel relationship during bending involves the use of distension zones. Structurally, distension zones are reinforced areas that serve to spread stress. Distension zones essentially perform the same function in considerably the same way to obtain the same result as indentations. Distension zones are illustrated in the extrusion cross-sections shown in FIGS. 11 and 13. In FIG. 11, first and second distension zones 123, 121 are located respectively on first and second side members 122 and 120. In FIG. 13, first and second distension zones 143, 141 are located respectively on first and second side members 140, 142. A cavity may be designed into the center of distension zones 121, 123, 141 and 143. It is believed that a hole may be placed through the center of distension zones 121, 123, 141 and 143 without significantly hindering its function. Again, though preferred, the distension zones need not be adjacently associated with the reinforcing web member.

Figure 5:
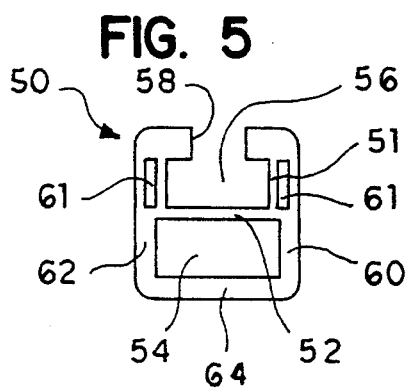
FIG. 5 is a cross-sectional view of a version of the extrusion configuration shown in FIG. 3 as modified in accordance with the present invention.
Figure 6:
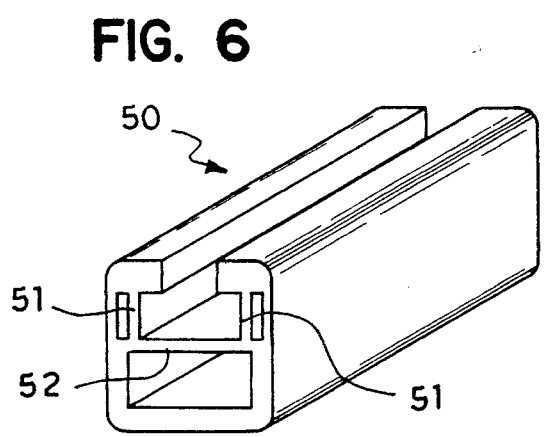
FIG. 6 is a perspective view of the modified extrusion shown in FIG. 5.
Figure 7:
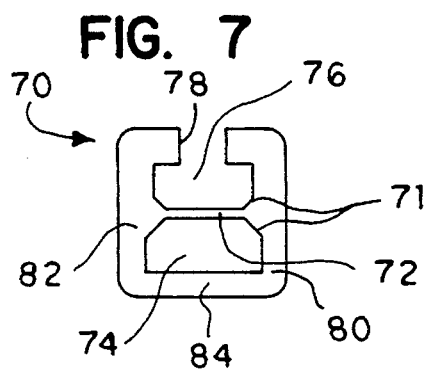
FIG. 7 is a cross-sectional view of another version of the extrusion configuration shown in FIG. 3 as modified in accordance with the present invention.
Figure 8:
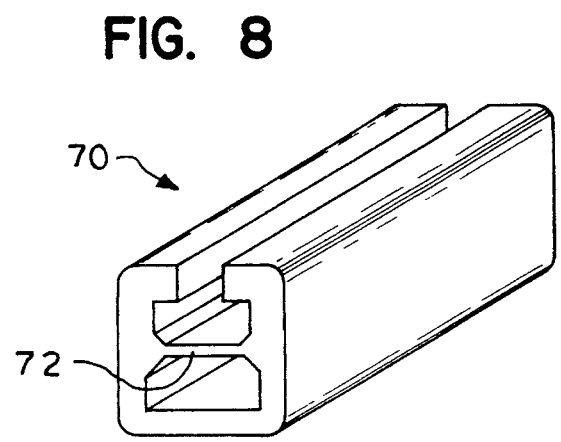
FIG. 8 is a perspective view of the modified extrusion shown in FIG. 7.

Still another additional means to help maintain the walls defining the channel in substantially parallel relationship with each other during bending, is to incorporate internal longitudinal bracing at the junctures of extrusion components. This bracing can be utilized where the side walls meet the base, and/or where the sidewalls meet the walls defining the channel, and/or between the web and the walls defining the channel. A typical location for this means of reinforcement would be inside all four corners 15a, 15b, 15c, 15d of FIG. 1. Another would be above and below the juncture of the inner web with side members 20, 22 in corners 17a, 17b, 17c, 17d. Another example is detailed in FIG. 5 wherein side units 51 serve the same function as logitudinal bracing. It will be appreciated that FIG. 5 is essentially the extrusion 10 of FIG. 1 with a cavity 61 in the upper zones of the side members 60, 62.

It is envisioned that other means of reinforcing extrusions can be derived from the means disclosed herein in accordance with the present invention.

Figure 19:
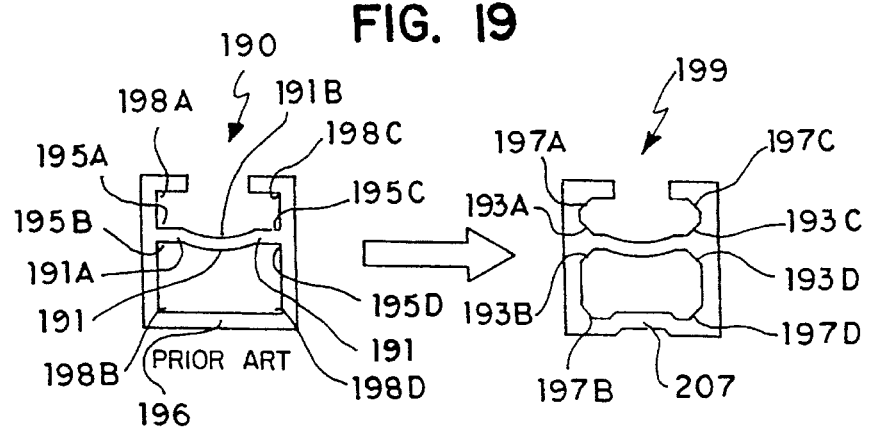
FIG. 19 shows an inoperable extrusion and the reinforcement means needed to make such extrusions operable in accordance with the present invention.

Further, in view of the present disclosure and its teachings, one can extrapolate techniques by which one can improve existing extrusion that will not bend properly. FIG. 19 shows the Sparkle Sign extrusion 190. Typically, the slot of this extrusion will close when bent to form an arcuate shape with the slot parallel to the bending plane. Employing some of the teachings disclosed herein, this extrusion can be made operable through incorporation of various reinforcing means. One method of improvement would be to add longitudinal bracing 197a, 197b, 197c, 197d inside all four outside corners 198a, 198b, 198c, 198d. Another would be to add distension zones 193a, 193b, 193c, 193d in the immediate corners 195a, 195b, 195c, 195d above and below the inverted arch platform 191. A third improvement would be to place an indentation 207 in the base 196. The preferred improvement would be to substantially straighten attachment platform 191 by making the central platform 191b substantially parallel to the base 196 and in substantially the same plane as left platform 191a and right platform 191c.

In view of the methods for improving bend intolerant extrusions and in further view of the operable features of the bend tolerant extrusions, it may be appreciated that extrusions 50 and 70 are modified versions of extrusion 30. Specifically extrusion 50 modifies extrusion 30 by the placement of cavities 61 through the thickened upper portions of sidewalls 60 and 62 to remove metal and thus lighten the extrusion. In this regard, the thicker upper portions are divided into a plurality of side units 51. In operation, side units 51 perform the same function in substantially the same way to obtain the same results as the thicker upper walls in sides 30 and 32 of extrusion 30.

Extrusion 70 modifies extrusion 30 by the placement of braces 71 at points where reinforcing web member contacts side walls 82 and 80. Despite the modification, the thickened upper walls retain their ability to provide structural integrity. Essentially, in operation, the modified side walls in extrusion 70 perform the same function in substantially the same way to obtain the same results as sides 30 and 32 of extrusion 30.

In much the same vein, extrusions 110 and 190 are both simple modifications of extrusion 90. Extrusion 110 merely takes extrusion 90 and adds metal to the side indentations to form operationally equivalent distension zones 123 and 121. It is briefly noted that both distension zones 123 and 121 are thicker than the surrounding areas of sides 120 and 122. Similar modifications were taken to create extrusion 130.

In light of the ease with which above embodiments may be permutated based on the teachings provided herein, it is to be understood that the present invention is not limited to the specific extrusions described above, but encompasses any and all embodiments within the scope of the following claims.

I claim:

1. A structural component for use in the construction of framed, flexible cover structures comprising:

a base member having a first end and a second end;

a first side member extending upward from said first end of said base member, said first side member having a first lower zone and a first upper zone, said first upper zone having a first width greater than a width of said first lower zone;

a second side member extending upward from said second end of said base member, said second side member having a second lower zone and a second upper zone, said second upper zone having a second width greater than a width of said second lower zone;

two walls, one of said two walls extending perpendicularly from and adjacent to said first upper zone of said first side member and the other of said two walls extending perpendicularly from and adjacent to said second upper zone of said second side member, said two walls defining a channel therebetween; and an inner web member connecting and contactably extending between said first side member and said second side member, wherein said structural component defines a first interior cavity below said inner web member and a fabric attachment cavity above said inner web member, said structural component defining a substantially square cross-section.

2. The structural component according to claim 1, wherein said first side member includes a first indentation, and said second side member includes a second indentation.

3. The structural component according to claim 1, wherein said base member includes a base member indentation.

4. The structural component according to claim 3, wherein said first side member includes a first indentation, and said second side member includes a second indentation.

5. The structural component according to claim 1, further comprising:

a first reinforcement means for preventing the inward collapse of said first side member, said first reinforcement means comprising a first distension zone in said first side member;

a second reinforcement means for preventing the inward collapse of said second side member, said second reinforcement means comprising a second distension zone in said second side member.

6. The structural component according to claim 1, further comprising:

a third reinforcement means for preventing the inward collapse of said side members, said third reinforcement means comprising a distension zone in said base member.

7. The structural component according to claim 6, further comprising:

a first reinforcement means for preventing the inward collapse of said first side member, said first reinforcement means comprising a first distension zone in said first side member;

a second reinforcement means for preventing the inward collapse of said second side member, said second reinforcement means comprising a second distension zone in said second side member.

8. The structural component according to claim 1, wherein said inner web member includes a central portion defining a plane parallel to said base member.

9. The structural component according to claim 1, wherein said inner web member defines a plane parallel to said base member.

10. The structural component according to claim 1, wherein said first interior cavity has a width greater than a width of said fabric attachment cavity.

11. A structural component for use in the construction of framed, flexible cover structures comprising:

a base member having a first end and a second end;

a first side member extending upward from said first end of said base member;

a second side member extending upward from said second end of said base member;

two walls, one of said two walls extending perpendicularly from and adjacent to an end of said first side member and the other of said two walls extending perpendicularly from and adjacent to an end of said second side member, said two walls being parallel to said base member, and said two walls defining a channel therebetween; and an inner web member connecting and contactably extending between said first side member and said second side member, said inner web member having a central portion defining a plane parallel to said base member, said structural component defining a first interior cavity below said inner web member and a fabric attachment cavity above said inner web member, said structural component defining a substantially square cross-section having a width, said inner web member spanning the width of said structural component.

12. The structural component according to claim 11, wherein said first side member includes a first indentation, and said second side member includes a second indentation.

13. The structural component according to claim 11, wherein said base member includes a base member indentation.

14. The structural component according to claim 13, wherein said first side member includes a first indentation, and said second side member includes a second indentation.

15. The structural component according to claim 11, further comprising:

a first reinforcement means for preventing the inward collapse of said first side member, said first reinforcement means comprising a first distension zone in said first side member;

a second reinforcement means for preventing the inward collapse of said second side member, said second reinforcement means comprising a second distension zone in said second side member.

16. The structural component according to claim 11, further comprising:

a third reinforcement means for preventing the inward collapse of said side members, said third reinforcement means comprising a distension zone in said base member.

17. The structural component according to claim 11, wherein said inner web member defines a plane parallel to said base member.

18. The structural component according to claim 11, wherein said first interior cavity has a width greater than a width of said fabric attachment cavity.

19. A structural component for use in the construction of framed, flexible cover structures comprising:

a base member having a first end and a second end;

a first side member extending upward from said first end of said base member and including a first indentation;

a second side member extending upward from said second end of said base member and including a second indentation;

two walls, one of said two walls extending perpendicularly from and adjacent to an end of said first side member and the other of said two walls extending perpendicularly from and adjacent to an end of said second side member, said two walls being parallel to said base member, and said two walls defining a channel therebetween; and an inner web member connecting and contactably extending between said first side member and said second side member, said structural component defining a first interior cavity below said inner web member and a fabric attachment cavity above said inner web member, said structural component defining a substantially square cross-section having a width, said inner web member spanning the width of said structural component.

20. The structural component according to claim 19, wherein said base member includes a base member indentation.

21. The structural component according to claim 19, further comprising:
   a first reinforcement means for preventing the inward collapse of said first side member, said first reinforcement means comprising a first distension zone in said first side member;
   a second reinforcement means for preventing the inward collapse of said second side member, said second reinforcement means comprising a second distension zone in said second side member.

22. The structural component according to claim 19, further comprising:
   a third reinforcement means for preventing the inward collapse of said side members, said third reinforcement means comprising a distension zone in said base member.

23. The structural component according to claim 22, further comprising:
   a first reinforcement means for preventing the inward collapse of said first side member, said first reinforcement means comprising a first distension zone in said first side member;
   a second reinforcement means for preventing the inward collapse of said second side member, said second reinforcement means comprising a second distension zone in said second side member.

24. The structural component according to claim 19, wherein said inner web member includes a central portion defining a plane parallel to said base member.

25. The structural component according to claim 19, wherein said inner web member defines a plane parallel to said base member.

26. The structural component according to claim 19, wherein said first interior cavity has a width greater than a width of said fabric attachment cavity.

27. A structural component for use in the construction of framed, flexible cover structures comprising:
   a base member having a first end and a second end, and further including a distension zone in said base member;
   a first side member extending upward from said first end of said base member;
   a second side member extending upward from said second end of said base member;
   two walls, one of said two walls extending perpendicularly from and adjacent to an end of said first side member and the other of said two walls extending perpendicularly from and adjacent to an end of said second side member, said two walls being parallel to said base member, and said two walls defining a channel therebetween; and an inner web member connecting and contactably extending between said first side member and said second side member, whereby said structural component defines a first interior cavity below said inner web member and a fabric attachment cavity above said inner web member, and said structural component defining a substantially square cross-section.

28. The structural component according to claim 27, wherein said first side member includes a first indentation, and said second side member includes a second indentation.

29. The structural component according to claim 27, further comprising:
   a first reinforcement means for preventing the inward collapse of said first side member, said first reinforcement means comprising a first distension zone in said first side member;
   a second reinforcement means for preventing the inward collapse of said second side member, said second reinforcement means comprising a second distension zone in said second side member.

30. The structural component according to claim 27, wherein said inner web member includes a central portion defining a plane parallel to said base member.

31. The structural component according to claim 27, wherein said inner web member defines a plane parallel to said base member.

32. The structural component according to claim 27, wherein said first interior cavity has a width greater than a width of said fabric attachment cavity.

33. A structural component for use in the construction of framed, flexible cover structures comprising:
   a base member having a first end and a second end, and further including a base member indentation therein;
   a first side member extending upward from said first end of said base member;
   a second side member extending upward from said second end of said base member;
   two walls, one of said two walls extending perpendicularly from and adjacent to an end of said first side member and the other of said two walls extending perpendicularly from and adjacent to an end of said second side member, said two walls being parallel to said base member, and said two walls defining a channel therebetween; and an inner web member connecting and contactably extending between said first side member and said second side member, wherein said structural component defines a first interior cavity below said inner web member and a fabric attachment cavity above said inner web member, and said structural component defining a substantially square cross-section.

34. The structural component according to claim 33, wherein said first side member includes a first indentation, and said second side member includes a second indentation.

35. The structural component according to claim 33, further comprising:
   a first reinforcement means for preventing the inward collapse of said first side member, said first reinforcement means comprising a first distension zone in said first side member;
   a second reinforcement means for preventing the inward collapse of said second side member, said second reinforcement means comprising a second distension zone in said second side member.

36. The structural component according to claim 33, wherein said inner web member includes a central portion defining a plane parallel to said base member.

37. The structural component according to claim 33, wherein said inner web member defines a plane parallel to said base member.

38. The structural component according to claim 33, wherein said first interior cavity has a width greater than a width of said second interior cavity.

39. A structural component for use in the construction of framed, flexible cover structures comprising:

a base member having a first end and a second end;

a first side member extending upward from said first end of said base member, and including a first reinforcement means for preventing the inward collapse of said first side member, said first reinforcement means comprising a first distension zone in said first side member;

a second side member extending upward from said second end of said base member, and including a second reinforcement means for preventing the inward collapse of said second side member, said second reinforcement means comprising a second distension zone in said second side member;

two walls, one of said two walls extending perpendicularly from and adjacent to an end of said first side member and the other of said two walls extending perpendicularly from and adjacent to an end of said second side member, said two walls being parallel to said base member, and said two walls defining a channel therebetween; and an inner web member connecting and contactably extending between said first side member and said second side member, said structural component defining a first interior cavity below said inner web member and a fabric attachment cavity above said inner web member, and said structural component defining a substantially square cross-section having a width, said inner web member spanning the width of said structural component.

40. The structural component according to claim 39, wherein said base member includes a base member indentation.

41. The structural component according to claim 39, further comprising:

a third reinforcement means for preventing the inward collapse of said side members, said third reinforcement means comprising a distension zone in said base member.

42. The structural component according to claim 39, wherein said inner web member includes a central portion defining a plane parallel to said base member.

43. The structural component according to claim 39, wherein said inner web member defines a plane parallel to said base member.

44. The structural component according to claim 39, wherein said first interior cavity has a width greater than a width of said fabric attachment cavity.

45. A structural component for use in the construction of framed, flexible cover structures comprising:

a base member having a first end and a second end;

a first side member extending upward from said first end of said base member, said first side member having a first upper zone and a first lower zone;

a second side member extending upward from said second end of said base member, said second side member having a second upper zone and a second lower zone;

two walls, one of said two walls extending perpendicularly from and adjacent to said first upper zone of said first side member and the other of said two walls extending perpendicularly from and adjacent to said second upper zone of said second side member, and said two walls defining a channel therebetween; and an inner web member connecting and contactably extending between said first side member and said second side member;

said first side member having first reinforcement means for preventing the inward collapse of said first side member, said first reinforcement means comprising a first distension zone being substantially located where said inner web member contactably extends to said first side member, said first distension zone being thicker than said first upper zone and said first lower zone; and said second side member having second reinforcement means for preventing the inward collapse of said second side member, said second reinforcement means comprising a second distension zone being substantially located where said inner web member contactably extends to said second side member, said second distension zone being thicker than said second upper zone and said second lower zone, said structural component defining a substantially square cross-section.

* * * * *